May 17, 1960 O. E. BALJE 2,936,714
TURBINE DRIVEN PUMP
Filed July 18, 1956 2 Sheets-Sheet 2

OTTO ERICH BALJE
INVENTOR.

BY *Lyon & Lyon*

ATTORNEYS

United States Patent Office
2,936,714
Patented May 17, 1960

2,936,714
TURBINE DRIVEN PUMP

Otto Erich Balje, Hollywood, Calif., assignor, by mesne assignments, to Crane Co., Chicago, Ill., a corporation of Illinois Application July 18, 1956, Serial No. 598,697

3 Claims. (Cl. 103—87)

This invention relates to a turbine driven pump and more particularly to a pump of the type described especially adapted for a fuel transfer or booster pump for use in aircraft fuel systems.

It is a feature of this invention that the pump is driven by a turbine in which the action upon the turbine wheel is by an essentially peripheral flow of the impelling fluid, usually hot, compressed air, which provides a turbine which developes maximum efficiency at relatively low r.p.m.

It is another feature of this invention that the turbine may be built without speed limiting controls, as it can run away when unloaded without damaging effect, due to factors inherent in the design which result in the turbine having a maximum speed well within the mechanical limitations of the structure.

It is an object of this invention to provide a turbine driven pump employing a unique turbine wheel.

It is a further object of this invention to provide a pump of the type described designed to be immersed in fluid to be pumped and cooled by bleeding fluid to adjacent the turbine bearings, which is especially useful when employing hot air as the impelling fluid.

These and other objects, features and advantages will be apparent from the annexed specification in which.

Figure 1:
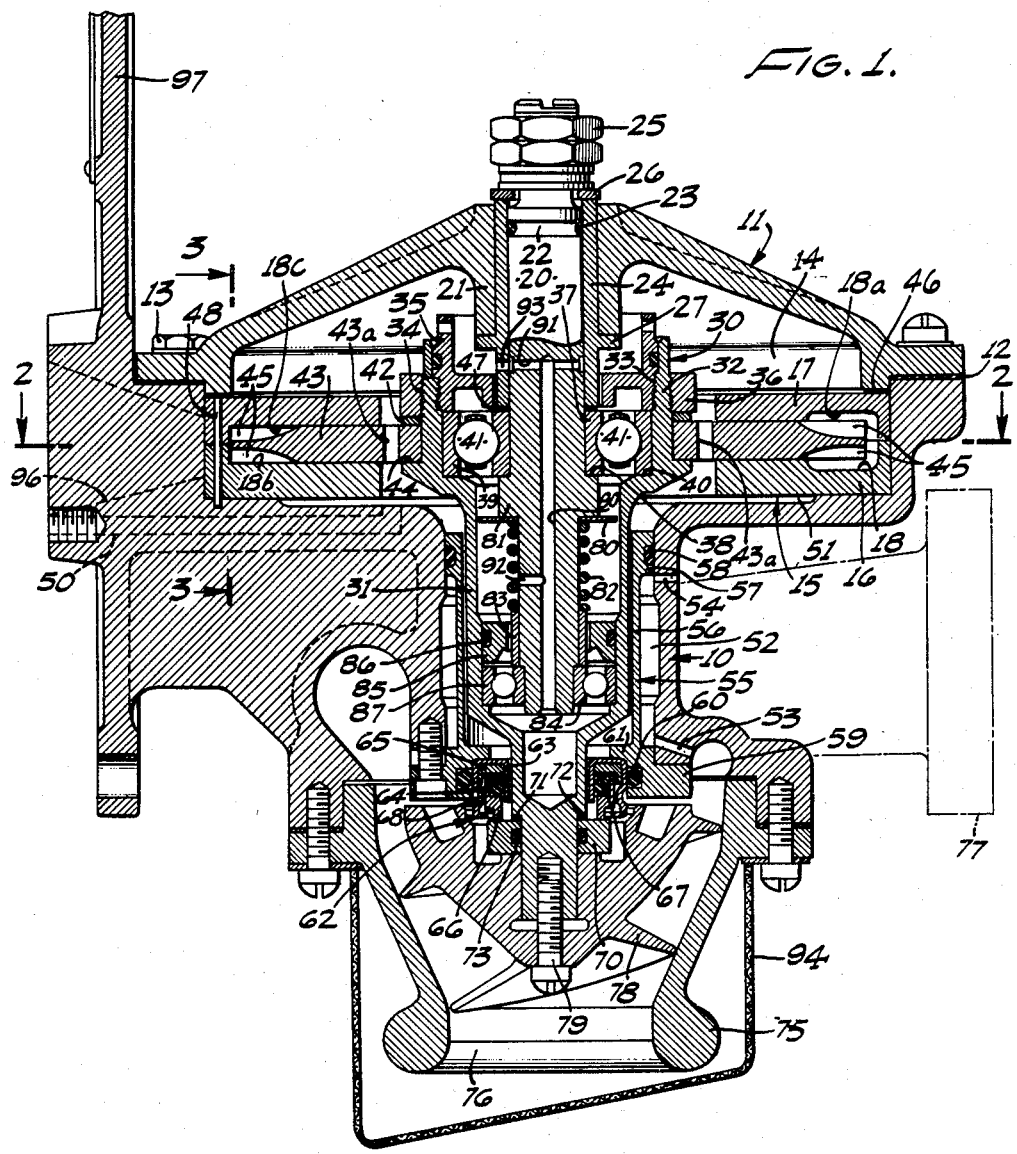
Figure 1 is a vertical section through a turbine driven pump embodying the present invention.

Referring now more particularly to the drawings, the pump is shown as comprising a body 10 and a cap 11 secured thereto by a bolt circle 13. A gasket 12 seals this connection. Between the body and cap is a space 14 in which there is seated a shroud 15 formed in two pieces 16 and 17. The pieces 16 and 17 are preferably formed of carbon and are provided with grooves 18 and 18a throughout the major portion of their circumference to provide a scroll for the turbine wheel, but these grooves are reduced as at 18b and 18c to the minimum required for clearance of the turbine wheel. This provides a block 19 between the inlet and outlet of the turbine and prevents leakage of impeller fluid to short circuit.

A shaft 20 is mounted in a sleeve 24 in hub 21 of cap 11, and has a groove 22 therein for receiving a sealing O ring 23. The outer end of shaft 20 is threaded and receives a locknut 25 which clamps a washer 26 to the top of sleeve 24. Sleeve 24 has a flange 27 which is drawn up tight against the lower edge of hub 21. A spindle assembly 30 is provided including the spindle 31 which has an upstanding flange 32 internally threaded at 33 and externally threaded at 34 for threaded connection with the grease seal 35 and ring 36 respectively. The inner race 37 of a ball bearing is mounted on shaft 20 and engages a shoulder 38 formed thereon. The outer race 39 of the bearing engages the inner wall of spindle flange 32 and a shoulder 40 formed thereon. A plurality of balls 41 are carried between the two races. This assembly comprises the upper bearing.

Figure 3:
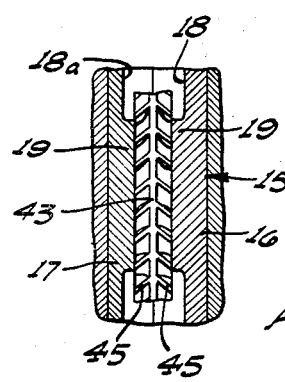
Figure 3 is a fragmentary section taken along the line 3—3 of Figure 1.

Ring 36 clamps a washer 42 against the turbine wheel 43 which engages shoulder 44 formed on the outside of spindle flange 32. The peripheral blades 45 of wheel 43 are slanted in opposite directions being inclined toward the direction of fluid flow, as shown in Figure 3, and extending radially inwardly from the periphery of wheel 43 on the side faces thereof. The wheel 43 is provided with a plurality of apertures 43a which operates to balance the fluid pressure on both sides of the wheel.

A shroud gasket 46 is provided on upper shroud piece 17 and a shim 47 is clamped between inner race 37 and the bottom of sleeve 24. A pin 48 passes through holes in pieces 17 and 18 and is doweled into body 10 to prevent rotation of shroud 16.

A drain passage 50 is provided for draining any fuel which leaks past the seals and enters the space 51 below shroud piece 16.

Body 10 has its bore enlarged as at 52 and passages 53 and 54 assure that fuel will be pumped into the bore for cooling the bearing hereinafter described.

A seal 55 is provided comprising a sleeve 56, a flange 57 carrying a sealing O ring 58 and a flange 59 carrying a sealing O ring 60.

Flange 59 has an inwardly extending rib 61 against which is seated a stator seal assembly 62. This assembly includes a cup 63, washer 64, spring 65, stator 66 and O ring 67. The cup 63 has portions 68 crimped into a slot in stator 66.

A ring 70 surrounds a reduced portion of spindle 31, clamps a shim 71 to shoulder 72 and is sealed by an O ring packing 73.

An impeller housing 75 is bolted to body 10 and has an inlet 76 and an outlet 77. An impeller 78 is affixed to the end of spindle 31 by screw 79. A strainer 94 surrounds inlet 76.

Within spindle 31 washer 80 is biased against a shoulder 81 on shaft 20 by a spring 82 which engages a ring 83. Ring 83 engages the inner race 84 of a ball bearing and a seal 85 carrying O ring 86 encompasses ring 83, a slight clearance being provided between seal 85 and ring 83, and between seal 85 and the outer race 87 of the ball bearing. The outer race 87 is seated on a shoulder on spindle 31 as shown, completing the lower bearing. The interior of spindle 31 below grease seal 35 is designed to be filled with grease to lubricate the bearings.

Means are provided for equalizing the fluid pressure on both sides of the upper and lower bearings. As shown in the drawings, these means may include the axial passage 90 in the stationary shaft 20, radial passages 91 and 92 therein which communicate with the exterior of the shaft, and a passage 93 in the sleeve 24 aligned with the passage 91.

Figure 2:
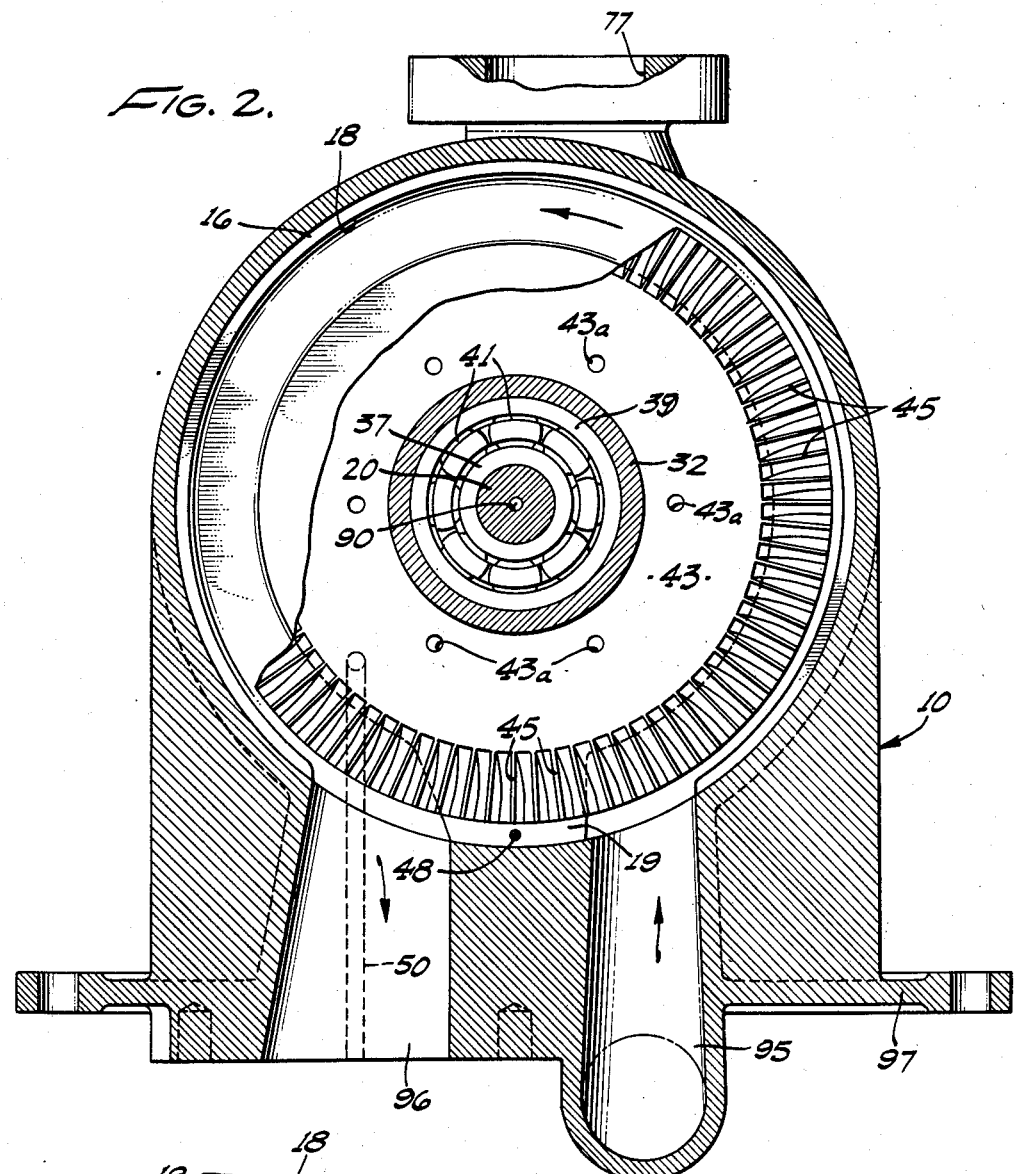
Figure 2 is a section taken along the line 2—2 of Figure 1.

Referring now more particularly to Figure 2, it will be seen that body 10 is provided with an impeller fluid inlet 95 and outlet 96 and a face plate 97 for bolting the pump in place.

The turbine, of course, drives the impeller 78, but due to the inherent characteristics of the turbine, being low speed and having a maximum efficiency at low speed, no controls are necessary.

The wheel 43 may be merely keyed to spindle 31 and left to float axially.

From the above description, it will be understood that the turbine drive mechanism differs from conventional turbine constructions which utilize deflection of the air or fluid stream for operation of the turbine wheel. The turbine of the present invention operates by means of a drag or shearing relationship between the fluid flow and the turbine wheel blades, the impelling fluid stream being forced in the direction of movement of the turbine wheel. Thus, the geometry of the scroll formed by the grooves or passages 18 and 18a, in conjunction with the geometry of the turbine blades is such as to obtain this result; the design being such as to obtain the maximum possible braking action per unit of weight flow.

While there has been described what is at present considered the preferred embodiment of the invention, it will be understood that various changes and alterations may be made therein without departing from the essence of the invention, and it is intended to cover herein all such changes and alterations as come within the true scope and spirt of the annexed claims.

I claim:

1. A fuel pump comprising the combination of a turbine including a wheel provided with blades, a carbon shroud surrounding said blades and forming a passage for impelling fluid, an inlet and outlet for impelling fluid, means forcing impelling fluid through said passage in the direction of movement of said turbine wheel whereby said turbine is caused to move by the drag effect of said impelling fluid moving with respect to and in contact with said blades; a pump including an impeller, a housing for said pump, said housing being provided with an inlet and an outlet; means connecting said turbine wheel and said impeller for driving of said impeller by said turbine, said means including a spindle driven by said turbine wheel; said pump being submersible in fuel to be pumped; bearing means rotatably mounting said spindle; means forming a cooling chamber on both sides of said bearing means; and bleed passages communicating with said outlet for bleeding fuel to both of said cooling chambers to cool the same.

2. A fuel pump comprising the combination of a turbine including a wheel provided with blades, a carbon shroud surrounding said blades and forming a passage for impelling fluid, an inlet and outlet for impelling fluid, means forcing impelling fluid through said passage in the direction of movement of said turbine wheel whereby said turbine is caused to move by the drag effect of said impelling fluid moving with respect to and in contact with said blades; a pump including an impeller, a housing for said pump, said housing being provided with an inlet and an outlet; means connecting said turbine wheel and said impeller for driving of said impeller by said turbine, said means including a spindle driven by said turbine wheel; said pump being submersible in fuel to be pumped; bearing means rotatably mounting said spindle; means forming a cooling chamber on both sides of said bearing means; bleed passages communicating with said outlet for bleeding fuel to both of said cooling chambers to cool the same; sealing means to prevent leakage of said fuel to said turbine; and a drain passage adjacent said turbine for draining off fuel leaking past said sealing means.

3. A fuel pump comprising the combination of a turbine including a wheel provided with inclined blades on the periphery thereof and extending radially inwardly on both sides thereof, a carbon shroud surrounding said blades and forming a passage for impelling fluid conforming to the periphery of said wheel, an inlet and outlet for impelling fluid, said shroud forming a block between said inlet and outlet, means forcing impelling fluid through said passage in the direction of movement of said turbine wheel whereby said turbine is caused to move by the drag effect of said impelling fluid moving with respect to and in contact with said blades, means for equalizing the fluid pressure on both sides of said turbine wheel; a pump including an impeller, a housing for said pump, said housing being provided with an inlet and an outlet; means connecting said turbine wheel and said impeller for driving of said impeller by said turbine; said means including a spindle driven by said turbine wheel; said pump being submersible in fuel to be pumped; bearing means rotatably mounting said spindle; means forming a cooling chamber on both sides of said bearing means; bleed passages communicating with said outlet for bleeding fuel to both of said cooling chambers to cool the same; sealing means to prevent leakage of said fuel to said turbine; a drain passage adjacent said turbine for draining off fuel leaking past said sealing means; and means for equalizing the pressure on both sides of said bearing means.

References Cited in the file of this patent

UNITED STATES PATENTS

| 169,712 | Laree | Nov. 9, 1875 |
| 1,211,831 | Edwards | Jan. 9, 1917 |
| 2,480,095 | Buchi | Aug. 23, 1949 |
| 2,611,323 | Digney | Sept. 23, 1952 |
| 2,646,210 | Kohlmann et al. | July 21, 1953 |
| 2,689,528 | Rainbow | Sept. 21, 1954 |

FOREIGN PATENTS

| 121 | Great Britain | of 1902 |
| 96,886 | Germany | June 18, 1897 |